(12) United States Patent
Allen (10) Patent No.: US 11,146,765 B2
(45) Date of Patent: Oct. 12, 2021

(54) SYSTEM AND METHOD FOR DISPLAYING VIDEO DATA IN A TARGET ENVIRONMENT

(71) Applicant: Everseen Limited, Blackpool (IE)

(72) Inventor: Joe Allen, Ballybunion (IE)

(73) Assignee: Everseen Limited, Blackpool (IE)

( * ) Notice: Subject to any disclaimer, the term of this patent is extended or adjusted under 35 U.S.C. 154(b) by 0 days.

(21) Appl. No.: 16/722,073

(22) Filed: Dec. 20, 2019

(65) Prior Publication Data

US 2021/0195149 A1 Jun. 24, 2021

(51) Int. Cl.
*H04N 9/31* (2006.01)
*G06K 9/00* (2006.01)

(52) U.S. Cl.
CPC ....... *H04N 9/3179* (2013.01); *G06K 9/00624* (2013.01)

(58) Field of Classification Search
CPC ............ G06K 9/00624; H04N 9/3179; H04N 9/3185; H04N 9/3194; H04N 9/3147; H04N 9/317
USPC ................................ 348/745, 806, 739, 571
See application file for complete search history.

(56) References Cited

U.S. PATENT DOCUMENTS

| | | | | |
|---|---|---|---|---|
| 2002/0105623 | A1* | 8/2002 | Pinhanez | H04N 5/74 353/69 |
| 2002/0173778 | A1* | 11/2002 | Knopp | B23K 26/0096 606/5 |
| 2003/0126013 | A1* | 7/2003 | Shand | G06Q 30/0269 705/14.52 |
| 2006/0208169 | A1* | 9/2006 | Breed | G06K 9/00624 250/221 |
| 2013/0050198 | A1* | 2/2013 | Song | H04N 13/393 345/419 |
| 2014/0118629 | A1* | 5/2014 | Larsen | G03B 21/12 348/744 |

(Continued)

FOREIGN PATENT DOCUMENTS

WO 2008021945 A2 2/2008

OTHER PUBLICATIONS

International Search Report dated Feb. 1, 2021 from International Application No. PCT/IB2020/060059.

*Primary Examiner* — John W Miller
*Assistant Examiner* — Sean N. Haiem
(74) *Attorney, Agent, or Firm* — Young Basile Hanlon & MacFarlane, P.C.

(57) ABSTRACT

A system for automatically displaying output information on a display surface based on activities in a target environment includes an image capturing device for capturing data of the target environment in real-time, a processing unit for processing the data to determine a location for displaying the output information, and determine a content of the output information, and a video output unit for displaying the output information on the display surface. The video output unit is configured to rotate in a 360° manner, and wherein an angle of rotation of the video output unit is controlled by the processing unit. The image capturing device further captures the output information displayed on the display surface in real time, and provides feedback data to the processing unit in real-time, so as to enable the processing unit to control a focus, a direction, and the output information displayed on the video output unit.

19 Claims, 5 Drawing Sheets

(56) References Cited

U.S. PATENT DOCUMENTS

| | | | |
|---|---|---|---|
| 2014/0176815 A1* | 6/2014 | Nagashima | G02B 26/101 |
| | | | 348/744 |
| 2017/0038942 A1* | 2/2017 | Rosenfeld | H04N 5/23238 |
| 2017/0134702 A1* | 5/2017 | Hashi | H04N 9/3185 |
| 2018/0008797 A1 | 1/2018 | Kozloski et al. | |
| 2019/0201806 A1* | 7/2019 | Weston | A63G 31/16 |
| 2019/0228589 A1* | 7/2019 | Dascola | G06F 3/04815 |
| 2020/0368616 A1* | 11/2020 | Delamont | A63F 13/25 |

* cited by examiner

SYSTEM AND METHOD FOR DISPLAYING VIDEO DATA IN A TARGET ENVIRONMENT

TECHNICAL FIELD

The present disclosure relates generally to a system and method for displaying video data in a target environment, and more particularly to displaying video data based on a closed loop Artificial Intelligence (AI) driven process, using real-time interactive visual and audio prompts.

BACKGROUND

Companies typically spend large amounts of money advertising newly launched products, by advertising on display screens in public places such as shopping centers, train/bus stations, etc. To maximise their profits and return on investment, companies want a maximum number of customers to buy the new product. However, existing display screens used for advertisements only display pre-programmed data. In particular, existing display screens do not display advertisements based on the customers being targeted.

Further, in Self Check-Out (SCO) stores, a cashier is not physically present at the billing counter to handle billing for a customer. This has led to an increase in theft rates. Thus, there is a need in SCO stores for a system to provide an audio/video alarm based on an observation of a theft. Similarly, in the event a customer is unable to use the SCO system properly, there is need for a system to alert a store supervisor that the customer may require attention and assistance.

Furthermore, in the event of a natural disaster (e.g. earthquakes, fire, tsunami, etc.), an alarm may be needed to alert people in public places about the disaster and provide them with directions to a place of greater safety. In emergency situations such as an attack on an army/naval base or a terrorist attack at a public place, current safety procedures do not help to locate the attacker or otherwise provide video/audio instructions to help officials to catch the attacker.

Furthermore, current systems for coaching/training students, fail to observe the environment of the students and adapt the coaching/training accordingly. For example, current training systems execute pre-established procedures for training medical or veterinary students and fail to take into account the environment of the students.

Hence, in view of the above, there exists a need for a system that takes into account an environment of one or more target users, and provides automated audio/video outputs accordingly.

SUMMARY

In an aspect of the present disclosure, there is provided a system for automatically displaying output information on a display surface based on one or more activities in a target environment. The system includes an image capturing device configured to capture image and video data of the target environment in real-time for recognizing one or more activities. The system may include a processing unit configured to process the image and video data to determine a location for displaying the output information, and determine a content of the output information. The system may further include a video output unit configured to display the output information on the display surface, wherein the video output unit is configured to rotate in a 360° manner, and wherein an angle of rotation of the video output unit is controlled by the processing unit. The image capturing device is further configured to capture the output information displayed on the display surface in real time, and provide feedback data to the processing unit in real-time, so as to enable the processing unit to control a focus, a direction, and the output information displayed on the video output unit.

In another aspect of the present disclosure, there is provided a method for automatically displaying output information on a display surface based on one or more activities in a target environment. The method includes capturing image and video data of the target environment in real-time for recognizing one or more activities. The method may further include processing the image and video data to determine a location for displaying the output information, and determine a content of the output information. The method may further include displaying the output information on the display surface by a video output unit, wherein the video output unit is configured to rotate in a 360° manner. The method may further include controlling an angle of rotation of the video output unit based on the captured image and video data. The method may further include capturing the output information displayed on the display surface in real time, and generating feedback data to control a focus, a direction, and the output information displayed on the video output unit.

In yet another aspect of the present disclosure, there is provided a computer programmable product for automatically displaying output information on a display surface based on one or more activities in a target environment. The computer programmable product comprises a set of instructions, the set of instructions when executed by a processor causes the processor to: capture image and video data of the target environment in real-time for recognizing one or more activities, process the image and video data to determine a location for displaying the output information and determine a content of the output information, generate an output information based on the processed data, and display the output information on the display surface by a video output unit. The video output unit is configured to rotate in a 360° manner, and an angle of rotation of the video output unit is controlled based on the captured image and video data. Further, the output information displayed on the display surface in real time is captured, and feedback data is generated to control a focus, a direction, and the output information displayed on the video output unit.

Various embodiments of the present disclosure provide a system that captures human behaviour and interacts and communicates with the humans to instruct or inform the humans in a fashion appropriate to the process and environment being observed. The system can take in visual, audio and other sensor inputs and create visual and audio outputs to form a closed loop interaction governed by the software intelligence operating in the background. The system may further act as an intelligent instructor/coach/supervisor allowing for automated assurance of optimum performance to standards and prescribed processes. The system creates the opportunity to have two way communication with the user using the camera for input and the projector for the output part and being controlled by the AI software.

The system is useful in a scenario where a user needs to be coached or trained. The camera may observe the environmental process and using the projector, direct the user to act according to the desired outcome and keep a record of the training. Another example would be to train medical or veterinary students to perform specific procedures. The closed loop feedback ensures that the AI software is in real time control and can alter or correct processes and activities as they occur. The closed loop AI driven process control using real time interactive visual and audio prompts/nudges to coach, control and or assure optimum process or behavioural outcomes.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF ILLUSTRATIVE EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Figure 1:
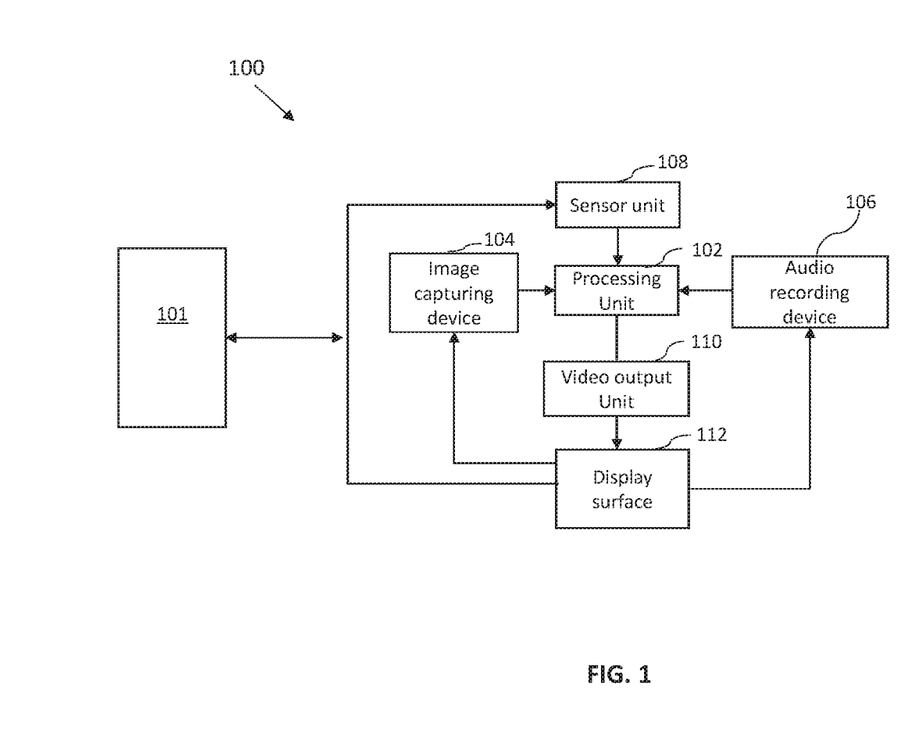
FIG. 1 is a diagram of an example system for displaying video data based on activities in a target environment, in accordance with an embodiment of the present disclosure.

FIG. 1 is a diagram of an example system 100 for displaying video data based on activities in a target environment 101, in accordance with an embodiment of the present disclosure. In an embodiment of the present disclosure, the target environment 101 may pertain to a self-checkout store (SCO), and although not shown, may include entities such as products, conveyors, industrial robots, and activities such as an operator entering or exiting the scene; picking, dropping, moving, weighting or scanning items; operating a touchscreen display; and paying through cash, mobile electronic transactions, or a credit card. However, it would be apparent to one of ordinary skill in the art, that the target environment 101 may pertain to general industrial areas, military/naval bases, training halls, security screening areas, shopping centers, and restaurants. In addition to the target environment 101 specified above, the system 100 may be useful in retail automation, customer up-selling, employee coaching, employee training, logistical automation (goods inwards/outwards), medical direction such as EG surgical training, surgical expert training with visual cues, emergency instructions in the event of fire, earthquake, and a shooting attack.

The system 100 includes a processing unit 102, an image capturing device 104, an audio recording device 106, a sensor unit 108, and a video output unit 110, communicatively coupled to each other through a communication network. The communication network may be any suitable wired network, wireless network, a combination of these or any other conventional network, without limiting the scope of the present disclosure. Some examples may include a Local Area Network (LAN), wireless LAN connection, an Internet connection, a point-to-point connection, or other network connection and combinations thereof. In one example, the network may include a mobile communication network, for example, 2G, 3G, 4G, or 5G mobile communication network. The communication network may be coupled to one or more other networks, thereby providing coupling between a greater number of devices. Such can be the case, for example, when networks are coupled together via the Internet.

The image capturing device 104 is configured to capture one or more images and videos of the target environment 101 in real-time for recognizing actions of various entities such as humans, animals, and things in an image frame, and transmit the captured data to the processing unit 102. Examples of the image capturing device 104 include, but are not limited to, a 360° camera, a Closed-Circuit Television (CCTV) camera, a High Definition (HD) camera, a non-HD camera, a handheld camera, a traffic camera, a police car camera, and a camera on an unmanned aerial vehicle (UAV).

The audio recording device 106 is configured to record audio data from the target environment 101 and transmit the recorded audio data to the processing unit 102. Examples of the audio recording device 106 include, but are not limited to, a dynamic microphone, a condenser microphone, a piezoelectric microphone or a ribbon microphone.

The sensor unit 108 is configured to detect events or changes in the target environment 101 and transmit the detected information to the processing unit 102. In one embodiment of the present disclosure, the target environment 101 is an army base/naval base; and the sensor unit 108 may include one or more radars installed therein to detect an attack on the base. In another embodiment, the target environment 101 is one or more residential/commercial buildings, and the sensor unit 108 may include sensors installed therein to detect the occurrence of a natural disaster in or near to the buildings; and to transmit the detected information to the processing unit 102. In yet another embodiment, the target environment 101 is a security check-point area of an airport, shopping (or other) mall, or other similar location; and the sensor unit 108 may include an x-ray device installed to detect the presence of a suspect item in the luggage, bags, clothing or other aspects of people in the site; and to transmit the detected information to the processing unit 102.

The processing unit 102 is a central control unit that controls the operation of the image capturing device 104, the audio recording device 106, the sensor unit 108, and the video output unit 110. The processing unit 102 is configured to process input data received from the image capturing device 104, the audio recording device 106, and the sensor unit 108, generate an output information based on the processed data, and display the output information on a display surface 112 through the video output unit 110. In an embodiment of the present disclosure, the output information may include pre-defined video and audio outputs including but not limited to, alarms, notifications, advertisements, instructions, and training videos for the target environment 101. In an embodiment of the present disclosure, the video output unit 110 may include a projector; and the display surface 112 may include a white projection screen, a grey projection screen, or a white wall for displaying the projected image from the projector. In an embodiment of the present disclosure, the processing unit 102 is configured to control the focus and direction of the video output unit 110; and to also control the content displayed by the video output unit 110. In another embodiment of the present disclosure, the video output unit 110 may include non-projection displays such as Light emitting Diode (LED), Liquid Crystal Display (LCD), and Organic Light Emitting Diode (OLED).

In an embodiment of the present disclosure, the image capturing device 104 captures the image/video data displayed on the display surface 112, and the audio recording device 106 records the audio data being played on the display surface 112, The processing unit 102 uses the feedback data to improve the quality of output information displayed on the display surface 112 to enhance user feedback.

In an embodiment of the present disclosure, the processing unit 102 includes an Artificial Intelligence (AI) platform that has the ability to direct visual information to precise locations in the target environment 101. The processing unit 102 may be implemented locally at a local computing device, or at a remote processing server. In the context of the present disclosure, the processing unit 102 may include an AI based processor, a graphical processing unit (GPU) for processing video/image data, a memory for storing one or more instructions. Throughout the present disclosure, the term 'AI based processor' relates to a computational element that is operable to respond to and process instructions stored in a corresponding memory. Optionally, the AI based processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. The processing unit 102 may include an initial set of pre-defined outputs programmed and augmented with dynamic outputs created by corresponding AI software.

Figure 2:
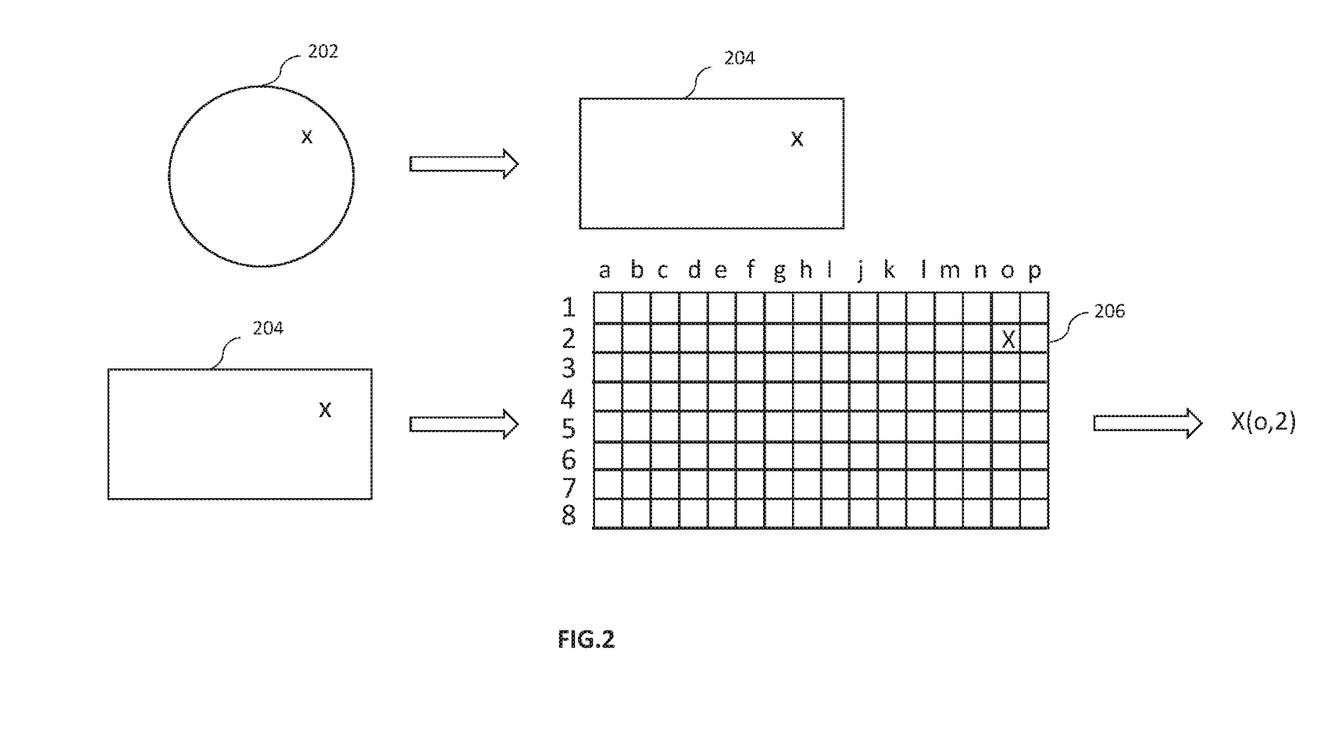
FIG. 2 is a diagram of an example operation for processing an image frame captured by the image capturing device, in accordance with an embodiment of the present disclosure.

FIG. 2 is a diagram of an example operation for processing an image frame 202 captured by the image capturing device 104 (as shown in FIG. 1), in accordance with an embodiment of the present disclosure. The image frame 202 is of circular shape, having been captured by a 360° lens of the image capturing device 104. The processing unit 102 (as shown in FIG. 1) receives the image frame 202 and creates a flattened representation of the image frame 202 to generate a flattened image 204. In an embodiment of the present disclosure, the processing unit 102 (as shown in FIG. 1) compensates for fisheye distortion while creating the flattened image 204, and generates a grid view image 206 of the flattened image 204.

The grid view image 206 includes a live grid referenced of the target environment 101 (as shown in FIG. 1). In one implementation, the grid characteristics, (i.e. number of rows and number of columns) are configurable by the user. In another implementation, the grid characteristics are dynamically variable. In this case, the grid characteristics are determined by the processing unit 102 that analyses motion detected in the view of the image capturing device 104, and ensures that the position of each individual element in the scene can be distinguished using the grid reference. The grid reference is then used to inform the processing unit 102 about activity occurring in the target environment 101 and the location of that activity.

In an example, when the target environment 101 is a shopping center, the image 204 may show a location usually crowded with people. The processing unit 102 may use this information to display pre-defined video advertisements in the corresponding location, to focus the attention of a maximum number of people on the advertisement. In another example, when the target environment 101 is a security screening area of an airport, shopping (or other) mall, or another similar location, the image 204 may pertain to an x-ray image revealing the presence of one or more suspected forbidden goods or items. The processing unit 102 may use this information to generate an audio/video alarm for the relevant security supervisor. The projection of video/image data on a display surface has been explained in detail with reference to FIG. 3A.

Figure 3A:
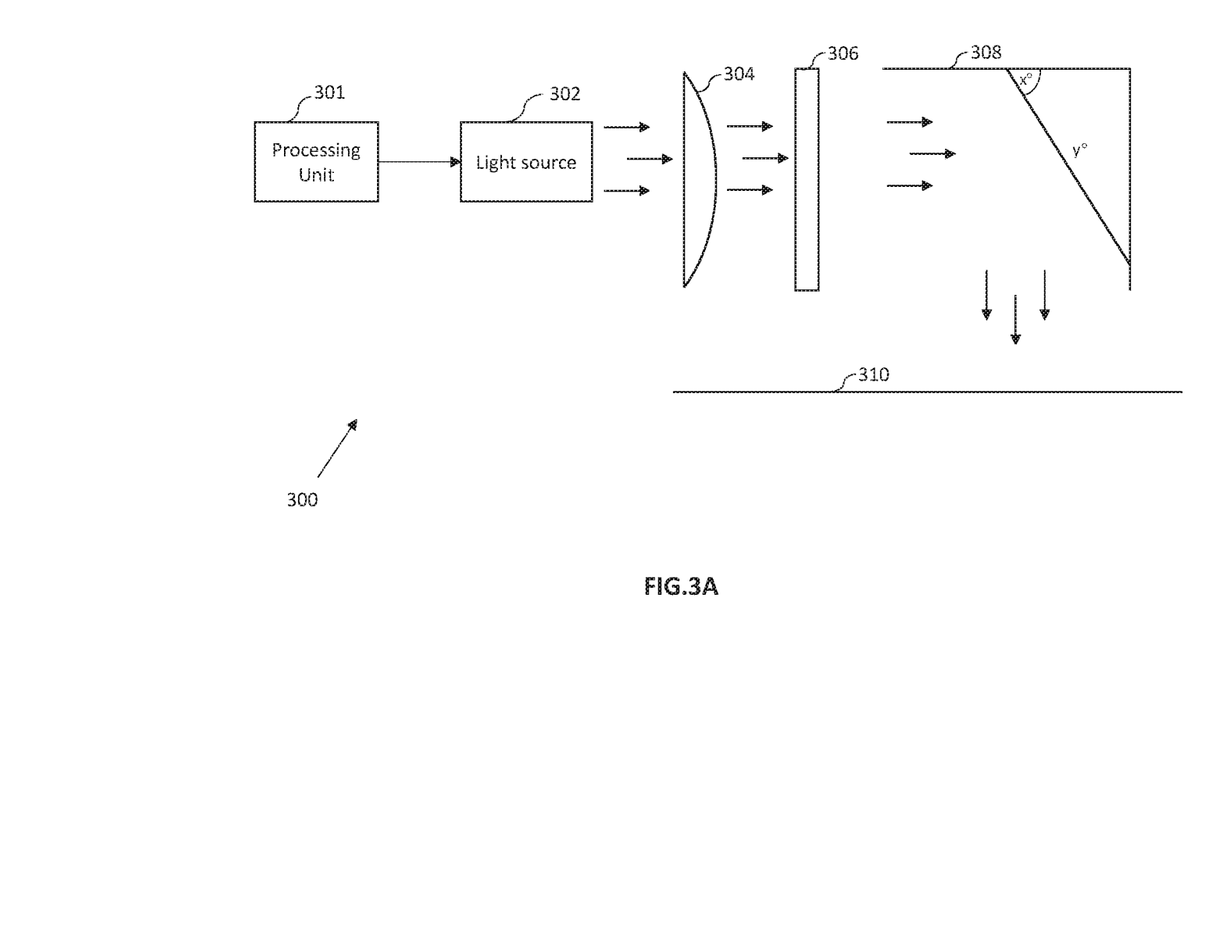
FIG. 3A is a diagram of an example video output unit for projecting pre-defined image/video data generated by a processing unit on a display surface, in accordance with an embodiment of the present disclosure.

FIG. 3A is a diagram of an example video output unit 300 (similar to the video output unit 110) for projecting pre-defined image/video data generated by a processing unit 301 (similar to the processing unit 102) on a display surface 310 (similar to the display surface 112), in accordance with an embodiment of the present disclosure.

The video output unit 300 includes a light source 302, a lens 304, a motorized focus system 306, and a motorized mirror 308. Examples of the light source 302 may include, but are not limited to, a laser, a lamp or an LED (light emitting diode). The lens 304 may include a lens with optical and digital zoom and a focussing ability. The motorized focus system 306 is configured to guide the light from the light source 302, reflected by the lens 304, towards the motorized mirror 308. The motorized mirror 308 is configured to be moved in the or each of the vertical and horizontal axes to project a predefined image/video at different inclinations/positions onto the display surface 310. In an embodiment of the present disclosure, the motorized mirror 308 is configured to rotate the pre-defined image/video by up to 90°, to display the pre-defined image at a predefined location on the display surface 310. The mechanism for rotating the motorized mirror 308 is explained in detail with reference to FIG. 3B.

Figure 3B:
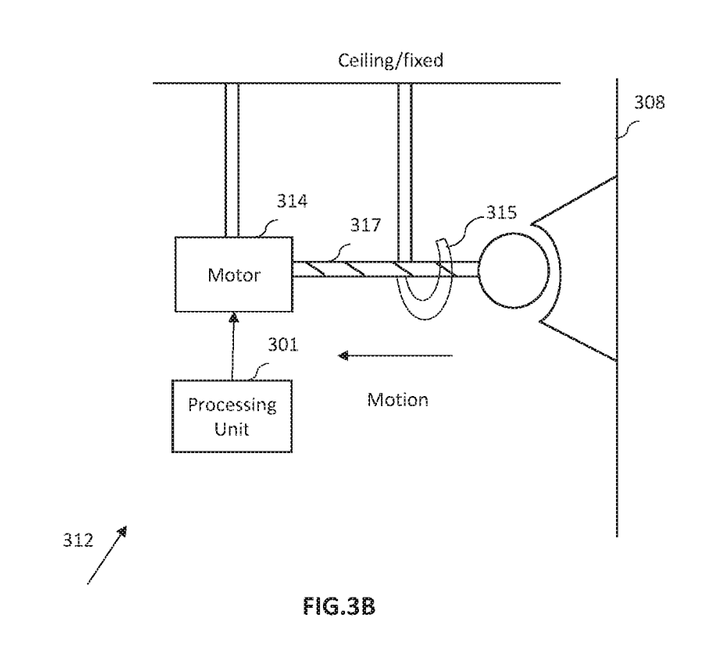
FIG. 3B is a diagram of an example mechanism for rotating the motorized mirror around vertical and horizontal axes in a mirror plane, in accordance with an embodiment of the present disclosure.

FIG. 3B illustrates the mechanism 312 for rotating the motorized mirror 308 around the vertical and horizontal axes in a mirror plane. The mechanism 312 includes a motor 314 fixed to a ceiling and coupled to the motorized mirror 308 and a physical hook 315 to ensure that motion rod 317 stays in a horizontal position. The motorized mirror 308 is fixedly attached to the ceiling. Thus, the normal axis to the motorized mirror 308 is fixed, thereby restricting its motion in along the depth axis.

Figure 3C:
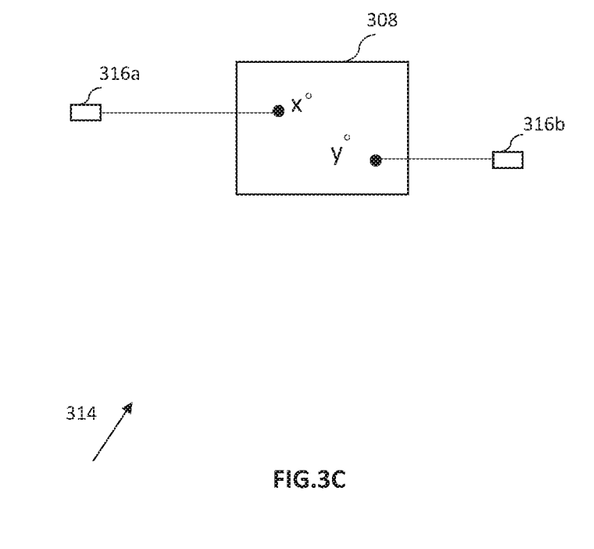
FIG. 3C illustrates an example motor including two electrically controlled levers, in accordance with an embodiment of the present disclosure.

FIG. 3C illustrates that the motor 314 may include two electrically controlled levers 316a and 316b adapted to control the rotation of the motorized mirror 308 in the horizontal and vertical directions.

Referring back to FIG. 3B, the motor 314 is controlled by the processing unit 301 (similar to the processing unit 102) in real time, so that when an activity is relayed to the processing unit 318 by corresponding sensor unit, the processing unit 301 generates relevant video/image output, and controls the motor 314 to direct the video/image output to a precise location on the display surface 310. In the context of the present disclosure, the motorized mirror 308 is configured to rotate in a 360° manner as instructed by the processing unit 318.

Referring back to FIG. 1, the image capturing device 104 is configured to capture video/image data displayed on the output surface 112, and provide the same to the processing unit 102, as feedback data. For example, if the projection is not clear enough, the processing unit 102 may adjust the focussing lens of the video output unit 110 to improve the quality of output image/video data.

In an embodiment of the present disclosure, based on previous experience and software learning, the processing unit 102 is configured to predict when an undesirable activity is likely to take place, in an effort to pre-empt and prevent such undesirable activities. Also, the processing unit 102 may build a risk profile to be used in a "What If" scenario analysis. For example, the processing unit 102 may detect that a process is not being followed correctly and highlights this to the user. However, the processing unit 102 may look at this scenario as both a potential negative risk and a potential positive risk at the same time. The processing unit 102 may predict the expected results of both scenarios and if it sees an unexpected benefit emerging from the process deviation, it can change the process automatically to incorporate the change into the improved process. This can happen on a standalone station to observe the results before pushing the change across the entire system. The processing unit 102 may store the previous process in the event that it needs to roll back to the original state for some unforeseen reason.

Figure 4:
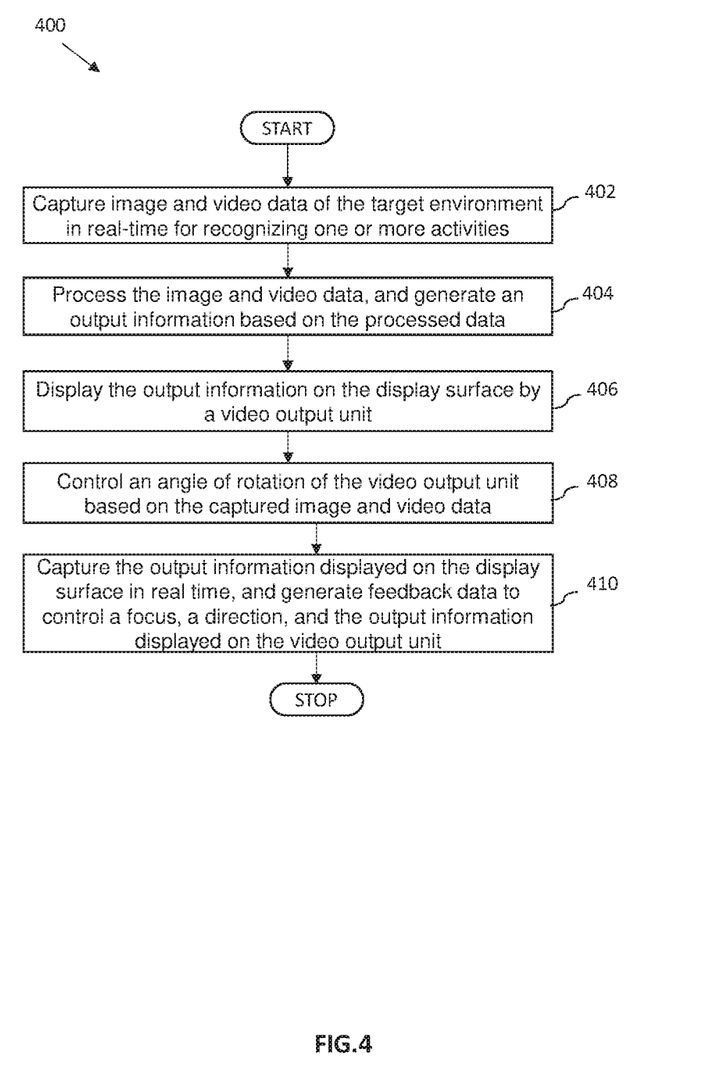
FIG. 4 is an example flowchart illustrating a method for automatically displaying video data on a display surface based on one or more activities in a target environment.

FIG. 4 is an example flowchart illustrating a method 400 for automatically displaying video data on a display surface based on one or more activities in a target environment, in accordance with the present disclosure. The method is depicted as a collection of steps in a logical flow diagram, which represents a sequence of steps that can be implemented in hardware, software, or a combination thereof.

At step 402, image and video data of the target environment is captured in real-time to permit the recognition of one or more activities occurring therein. The image and video data may be captured using at least one of: a 360° camera, a Closed-Circuit Television (CCTVs) camera, a High Definition (HD) camera, a non-HD camera, a handheld camera, a traffic camera, a police car camera, and a camera mounted on an unmanned aerial vehicle (UAVs).

At step 404, the image and video data are processed, and an output information is generated based on the processed data. According to an embodiment of the present disclosure, the video/image data is processed using a graphical processing unit (GPU). In an embodiment of the present disclosure, the output information comprises pre-defined video and audio data including at least one of: alarms, notifications, advertisements, instructions, and training videos. Further, according to an embodiment of the present disclosure, the output information is generated based on a grid view image. The grid view image is generated by receiving a circular input image frame and creating a flattened representation of the circular input image frame to generate a grid view image of the flattened representation. Further, the grid view image provides information regarding position of one or more entities in the circular input image frame.

At step 406, the output information is displayed on the display surface by a video output unit. In an embodiment of the present disclosure, the video output unit is configured to rotate in a 360° manner. In an embodiment of the present disclosure, the video output unit comprises a projector, and the display surface comprises at least one of: a white projection screen, a grey projection screen, and a white wall for displaying a projected image.

At step 408, an angle of rotation of the video output unit is controlled based on the captured image and video data. In an embodiment of the present disclosure, the video output unit includes a light source, a lens, a motorized mirror and a motorized focus system. The motorized mirror is configured to be moved in horizontal and vertical directions to project a predefined image onto one or more positions of the display surface and a movement of the motorized mirror is controlled by one or more electrically controlled levers based on the angle of the rotation. Further, the motorized focus system is configured to guide a light from the light source reflected by the lens towards the motorized mirror.

At step 410, the captured output information is displayed on the display surface in real time, and feedback data is generated to control a focus and a direction of the video output unit; and to further control the output information displayed on the video output unit. In an example, if the projection is not clear enough, the focussing lens of the video output unit is adjusted to improve the quality of the displayed output information. This is achieved by having a feedback loop between the projected image and the camera input. The AI software may detect an out of focus image and send the correction signals to the lens to improve the image quality. This is an ongoing loop as the display surface may move or change shape.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for displaying information on a display surface based on a location and activity of one or more entities in a target environment, the system comprising:
    an image capturing device configured to capture image and video data pertaining to the target environment using a fish eye view for generating a circular image frame of the target environment;
    a processing unit in communication with the image capturing device, the processing unit configured to:
    receive the circular image frame, representative of the fish-eye view, of the target environment by the image capturing device;
    generate an image frame having a flattened configuration of the target environment from the circular image frame; and
    generate a grid view image on the flattened configuration of the image frame, wherein the generated grid view image includes a live grid reference of the target environment on the image frame having the flattened configuration, and wherein the live grid reference is used by the processing unit to determine information regarding location and activity of the one or more entities in the target environment; and a video output unit in communication with the processing unit and the image capturing device, wherein the processing unit operably rotates the video output unit in a 360° manner and configures:

the video output unit to display an output, based on the information determined from the live grid reference, on the display surface, and the image capturing device to capture the output information displayed on the display surface to generate feedback data and provide the feedback data to the processing unit so as to enable the processing unit to control, in real time, a focus, a direction, and a content of the information displayed on the display surface by the video output unit based on the feedback data.

2. The system of claim 1 further comprising an audio recording device configured to record audio data of the target environment and transmit the recorded audio data to the processing unit, and wherein the audio recording device is configured to record audio data of the output information as feedback data, and provide the feedback data to the processing unit for enabling the processing unit to control, in real time, the focus, the direction, and the content of the information displayed on the display surface by the video output unit based on the feedback data of the audio recording device.

3. The system of claim 1, wherein the processing unit includes an Artificial Intelligence (AI) platform that is configured to direct visual information to one or more predefined locations in the target environment.

4. The system of claim 1, wherein the processing unit includes a graphical processing unit (GPU) for processing video/image data.

5. The system of claim 1, wherein the output information comprises pre-defined video and audio data including at least one of: alarms, notifications, advertisements, instructions, and training videos.

6. The system of claim 1, wherein the video output unit comprises a projector, and the display surface comprises at least one of: a white projection screen, a grey projection screen, and a white wall for displaying a projected image.

7. The system of claim 1, wherein the processing unit is configured to generate and display the output information based on the grid view image.

8. The system of claim 1 further comprising a sensor unit configured to detect events as one or more changes in the target environment, wherein the sensor unit includes at least one of: a radar, an x-ray, a scanner, a motion sensor, a temperature sensor, a gas sensor, and a fire sensor.

9. A method for displaying information on a display surface based on a location and activity of one or more entities in a target environment, the method comprising:

capturing image and video data from the target environment using a fish eye view of an image capturing device for generating a circular image frame of the target environment;

generating an image frame having a flattened configuration of the target environment from the circular image frame using a processing unit;

generating, by the processing unit, a grid view image on the flattened configuration of the image frame, wherein the generated grid view image includes a live grid reference of the target environment on the image frame having the flattened configuration;

determining, by the processing unit, information regarding location and activity of the one or more entities in the target environment using the live grid reference;

rotating, by the processing unit, a video output unit in a 360° manner;

generating by the processing unit and displaying on the display surface by the video output unit, an output based on the information determined from the live grid reference on the display surface, and capturing the output information displayed on the display surface using the image capturing device to generate feedback data, and providing the feedback data to the processing unit so as to enable the processing unit to control, in real time, a focus, a direction, and a content of the information displayed on the display surface by the video output unit based on the feedback data.

10. The method of claim 9 further comprising:

recording audio data of the target environment and transmitting the recorded audio data using an audio recording device; and recording audio data of the output information as feedback data and providing the feedback data by the audio recording device to the processing unit for enabling the processing unit to control, in real time, the focus, the direction, and the content of the information displayed on the display surface by the video output unit based on the feedback data of the audio recording device.

11. The method of claim 9 further comprising directing visual information to one or more predefined locations in the target environment using an AI platform.

12. The method of claim 9 further comprising processing the video/image data using a graphical processing unit (GPU).

13. The method of claim 9, wherein the output information comprises pre-defined video and audio data including at least one of: alarms, notifications, advertisements, instructions, and training videos.

14. The method of claim 9, wherein the video output unit comprises a projector, and the display surface comprises at least one of: a white projection screen, a grey projection screen, and a white wall for displaying a projected image.

15. The method of claim 9 further comprising generating, by the processing unit, and displaying the output information on the display surface, by the video output device, based on the grid view image.

16. The method of claim 9 further comprising detecting events as one or more changes in the target environment using a sensor selected from a group consisting of: a radar, an x-ray, a scanner, a motion sensor, a temperature sensor, a gas sensor, and a fire sensor.

17. A non-transitory computer readable medium configured to store a program that when executed by a processing unit of a computer causes the processing unit to display output information on a display surface based on a location and activity of one or more entities in a target environment, the program configured to:

receive image and video data from the target environment using a fish eye view of an image capturing device to generate a circular image frame of the target environment;

generate an image frame having a flattened configuration of the target environment from the circular image frame using the processing unit; and generate, using the processing unit, a grid view image on the flattened configuration of the image frame, wherein the generated grid view image includes a live grid reference of the target environment on the image frame having the flattened configuration, and determine, by the processing unit, information regarding location and activity of the one or more entities in the target environment using the live grid reference;

rotate, by the processing unit, a video output unit in a 360° manner; and display an output based on the information determined from the live grid reference on the display surface using a video output device;

capture the output information displayed on the display surface using the fish eye view of the image capturing device to generate feedback data, and control in real-time, using the processing unit, a focus, a direction, and a content of the information displayed on the display surface by the video output unit based on the feedback data.

18. The system of claim 1, wherein the video output unit comprises:

a light source;

a lens;

a motorized mirror configured to be moved in horizontal and vertical directions to project a predefined image onto one or more positions of the display surface, wherein a movement of the motorized mirror is controlled by one or more electrically controlled levers operated by the processing unit; and a motorized focus system configured to guide a light from the light source reflected by the lens towards the motorized mirror.

19. The method of claim 9, wherein the video output unit comprises:

a light source;

a lens;

a motorized mirror configured to be moved in horizontal and vertical directions to project a predefined image onto one or more positions of the display surface, wherein a movement of the motorized mirror is controlled by one or more electrically controlled levers; and a motorized focus system configured to guide a light from the light source reflected by the lens towards the motorized mirror.

* * * * *